UNITED STATES PATENT OFFICE.

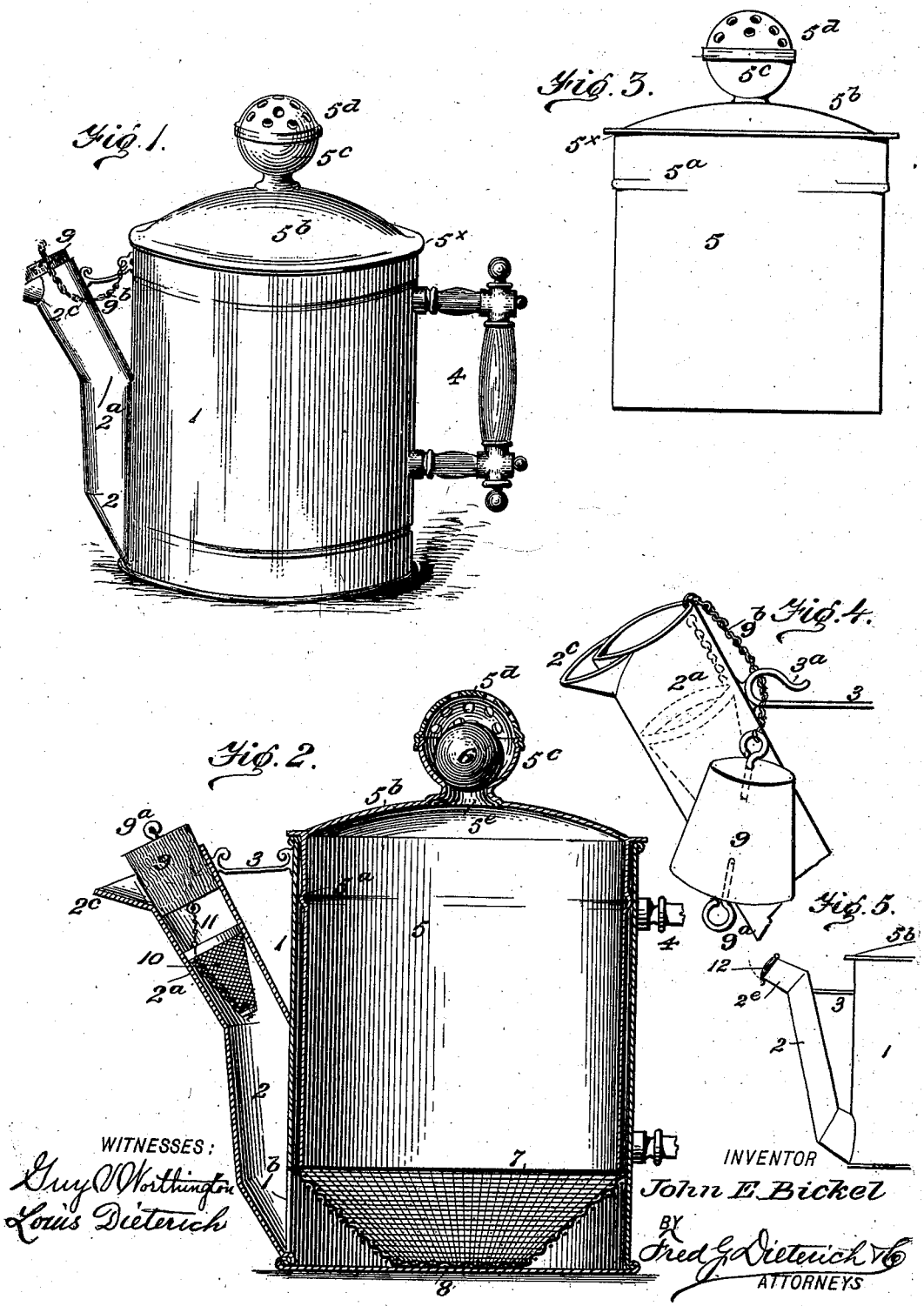

JOHN E. BICKEL, OF HARRISBURG, PENNSYLVANIA.

COFFEE-POT.

SPECIFICATION forming part of Letters Patent No. 692,761, dated February 4, 1902.

Application filed August 30, 1901. Serial No. 73,782. (No model.)

*To all whom it may concern:*

Be it known that I, JOHN E. BICKEL, residing at Harrisburg, in the county of Dauphin and State of Pennsylvania, have invented a new and Improved Coffee-Pot, of which the following is a specification.

My invention relates to that type of coffee-pots having a removable percolator or strainer and it seeks to provide an improved pot of this type of a very simple, neat, and economical construction in which the parts are coöperatively arranged so they can be conveniently handled and the coffee quickly brewed without the aroma escaping to atmosphere.

In its generic nature my invention comprehends a pot, a strainer adapted to seat on the bottom of the pot, and a cover or lid having a pendent member adapted to snugly fit within the pot and produce a substantially hermetic seal and to render the pot practically steam-tight without the aid of gages, screws, or other devices common in other styles of coffee-pots of this type.

In its more complete nature my invention embodies a pot, an inverted-cone-shaped or cup strainer adapted to seat on the bottom of the pot, said pot having an outlet at a point below the strainer-top, and a detachable top having a pendent portion to snugly fit the pot to form a steam-tight connection and to act as a detent or lock to hold the strainer properly seated in the pot-bottom during pouring or tilting of the pot, said top also having a vent and an automatically-closing valve therefor.

In its more subordinate features my invention consists in certain novel details of construction and peculiar combination of parts, all of which will hereinafter be fully described, and particularly pointed out in the appended claims, reference being had to the accompanying drawings, in which—

Figure 1 is a perspective view of my form of coffee-pot. Fig. 2 is a vertical section of the same. Fig. 3 is a side view of the removable top and inner cylinder. Fig. 4 is a view of a slightly-modified arrangement of the spout-closure devices. Fig. 5 is a view of another modification of the same.

Referring to the drawings, in which like numerals indicate like parts in all the figures, 1 designates the pot, which is of the usual straight-cylinder kind, provided at one side with a suitably-ornamented handle 4, and on the side opposite the handle it has a pouring-spout 2, the peculiar construction of which and its correlative arrangement with the strainer and the pot-closure member form a feature of my invention.

7 designates a strainer having a cup of inverted-cone shape, with a flattened base to seat on the pot-bottom, as clearly shown in Fig. 2, by reference to which it will also be noticed the upper end of the strainer 7 has a diameter equal that of the pot to snugly fit against the sides thereof. The pot 1 at the spout side has an outlet $1^b$, which starts at the bottom and extends up to the level of the bottom of the pendent rim 5 of the cover or lid, presently again referred to.

The pouring-spout 2 in the practical construction may be of any ornamental shape. In the drawings I have shown the same as extended up to about midway the height of the pot and then projected outward on an angle, as at $2^a$, and said part $2^a$ being braced by the member 3. The pouring end of the spout may also be made to suit the general style of the pot. For the cheaper grades I prefer to use an ordinary cork stopper 9 as a closure member, as shown in Fig. 1, joined to the pot by the chain $9^b$.

To further strain the coffee and make the liquid still clearer, the cork can be provided with a screw-eye $9^a$, having a shank extended into the cork body, and a second screw-eye at the bottom to secure a short lift-chain 11, adapted to sustain a conical strainer 10, made of fine wire-cloth and adapted to slip down into the spout. By providing an additional strainer, arranged as shown and described, the said strainer can be readily pulled out and cleaned and the chain 11 made of sufficient length to permit the cork when off the spout to hang suspended from a hook member $3^a$ on the bracket 3, as clearly shown in Fig. 4, and thus be held out of the way when pouring without pulling on or disturbing the spout-strainer.

Instead of providing a spout construction as shown in Figs. 1, 2, and 4, the same may be constructed as shown in Fig. 5, in which the spout is shown with an extra pouring end 2ᵉ, having the usual gravity closure-cap 12.

The lid or pot-cover before referred to, the construction of which and its combination with the pot and strainer 7 form an essential feature of my invention, consists of the top proper, 5ᵇ, having the usual flange-rim 5ˣ to fit closely over the upper edge of the pot-body 1, and a central outlet 5ᶜ, that discharges into a hollow ornamental top piece, shown globe-like in the drawings, and which consists of a lower imperforated half 5ᶜ and an upper perforated half 5ᵈ, the two forming a large lifting-knob and also a vent for the escape of air and steam. The two parts 5ᶜ and 5ᵈ are separable and may be held together by friction or by a screw-thread, and within said knob works a cork ball or gravity-valve 6, which normally closes off the outlet 5ᵉ. By making the knob of two sections the cork ball can be readily removed and cleaned or a new one substituted. The pot-closure member also includes in its make-up a pendent portion 5, the upper part of which has a diameter to fit the pot-body and has a beaded portion 5ª, adapted to engage and form a kissing frictional contact with the sides of the pot-body, whereby when the top is closed down a close fit of the cover or closure member is effected and the pot rendered substantially steam-tight. The lower end of the part 5 is made to loosely fit within the body 1 and is of such length as to extend down close over the upper end or rim of the strainer 7, and by reason of such relative arrangement of the parts 5 and 7 the part 5 acts as a lock-detent to prevent the strainer 7 tilting or losing its proper position during handling or tilting of the pot. The strainer-cup being of an inverted-cone shape ample space is left at the bottom to receive the strained coffee and permit of its free flow out through the outlet 1ᵇ.

The pot can be made of any suitable material, in accordance with the grade desired, the correlation of the parts being such as to permit of varied external ornamental shapes.

From the foregoing, taken in connection with the accompanying drawings, it is thought the advantages of my improvement will be readily apparent. The several parts are of themselves of a simple and novel construction and adapted for economical manufacture and for being readily removed for cleaning and again assembled. It will be noticed the lid requires no screwing on or other special devices for securing same in place, as it becomes, as it were, a rigid part of the pot as soon as it is pushed down into the same.

Having thus described my invention, what I claim, and desire to secure by Letters Patent, is—

1. In a pot of the character described, the combination with the body 1, having a pouring-opening near the bottom, and a spout leading therefrom, and the cup-shaped strainer 7, removably supported on the bottom of the pot; of the lid or cover having a pendent member 5, adapted to snugly fit within the pot, steam-tight, and having its lower edge oppose the upper edge of the strainer, for the purposes specified.

2. A coffee-pot, consisting of a cylindrical body, a removable inverted-cone-shaped strainer adapted to seat on the pot-bottom, and having its upper or widest portion of a diameter to engage the pot sides, said pot having a pouring-opening below the upper edge of the strainer and a spout joined therewith, a closure member consisting of a lid or cover, and a pendent portion adapted to detachably fit within the pot, having a length to extend down in close proximity to the strainer-top, and having a part made to closely fit the inside of the pot to form a steam-tight joint, the aforesaid lid having a vent-opening, and an imperforated vertical extension surrounding the vent, a perforated member adapted to connect with the imperforated extension, and a gravity-valve held in said imperforated extension, all being arranged substantially as shown and for the purposes described.

3. In a coffee-pot of the character described, the combination with the pot-body, a strainer held therein, and a pouring-spout, said spout having a hook member; of the supplemental conical strainer, adapted to detachably seat in the spout, a spout-stopper, and a flexible connection joining the conical strainer and spout-stopper, all being arranged substantially as shown and described.

JNO. E. BICKEL.

Witnesses:
HARVEY T. SMITH,
E. MÖSLEIN.